United States Patent [19]

Kluttz et al.

[11] Patent Number: 5,082,885
[45] Date of Patent: Jan. 21, 1992

[54] STABILIZED ETHYLENE-CARBON MONOXIDE COPOLYMER COMPOSITIONS

[75] Inventors: Robert Q. Kluttz, Houston, Tex.; Johannes L. M. Syrier, Badhuisweg, Netherlands

[73] Assignee: Shell Oil Company, Houston, Tex.

[21] Appl. No.: 574,029

[22] Filed: Aug. 29, 1990

Related U.S. Application Data

[63] Continuation-in-part of Ser. No. 476,847, Feb. 8, 1990, which is a continuation-in-part of Ser. No. 382,512, Jul. 20, 1989, abandoned.

[51] Int. Cl.$^5$ .................................................. C08K 5/13
[52] U.S. Cl. ...................................... 524/347; 524/324; 524/339; 524/340; 524/345; 524/346
[58] Field of Search ................ 524/339, 340, 345, 346, 524/347, 324

[56] References Cited

U.S. PATENT DOCUMENTS

| | | | |
|---|---|---|---|
| 2,335,089 | 11/1943 | Sibley | 524/345 |
| 3,424,821 | 1/1969 | Hunter | 524/347 |
| 3,476,814 | 11/1969 | Meltsner et al. | 524/339 |
| 3,676,401 | 7/1972 | Henry | 523/126 |
| 3,694,412 | 9/1972 | Nozaki | 528/392 |
| 3,753,952 | 8/1973 | Guillet | 523/125 |
| 3,929,727 | 12/1975 | Russell et al. | 524/338 |
| 3,984,940 | 10/1976 | Reich et al. | 524/343 |
| 4,024,104 | 5/1977 | Russell et al. | 524/91 |
| 4,795,774 | 1/1989 | Klutz | 524/246 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,880,903 | 11/1989 | Van Broekhoven et al. | 528/392 |
| 4,954,548 | 9/1990 | Klingensmith | 524/258 |

FOREIGN PATENT DOCUMENTS

| | | |
|---|---|---|
| 121965 | 10/1984 | European Pat. Off. |
| 181014 | 5/1986 | European Pat. Off. |
| 213671 | 3/1987 | European Pat. Off. |
| 257663 | 3/1988 | European Pat. Off. |
| 1081304 | of 1967 | United Kingdom |

OTHER PUBLICATIONS

J. Pospisil et al., "Dihydric Phenols as Antioxidants in Isotactic Polypropylene Derivatives of Pyrocatechol" Stabilization of Polymers and Stabilizer Processes, pp. 169–190 (1968).

J. Pospisil et al., "Dihydric Phenols as Antioxidants in Isotactic Polypropylene-Derivatives of Hydroquinone"-Stabilization of Polymers and Stabilizer Processes, pp. 191–201 (1968).

G. Scott, "Developments in Polymer Stabilization", Univ. of Aston, Birmingham, UK, Applied Sci. Publishers, pp. 73–85.

*Primary Examiner*—Veronica P. Hoke
*Attorney, Agent, or Firm*—James O. Okorafor

[57] ABSTRACT

Improved thermal stability and melt stability is demonstrated by stabilized compositions comprising a linear alternating polymer of carbon monoxide and at least one ethylenically unsaturated hydrocarbon having incorporated therein a stabilizing quantity of a phenolic compound of defined structure.

33 Claims, No Drawings

STABILIZED ETHYLENE-CARBON MONOXIDE COPOLYMER COMPOSITIONS

RELATED APPLICATION

This application is a continuation-in-part of copending U.S. patent application Ser. No. 476,847, filed Feb. 8, 1990, which was a continuation-in-part of U.S. patent application Ser. No. 382,512, filed July 20, 1989 all now abandoned.

FIELD OF THE INVENTION

This invention relates to certain stabilized compositions comprising a linear alternating polymer of carbon monoxide and at least one ethylenically unsaturated hydrocarbon. More particularly, the invention relates to such polymer compositions of improved melt stability and heat stability.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium salts as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. More recent processes for the production of these polymers, now known as polyketones or polyketone polymers, are illustrated by a number of published European Patent Applications including 121,965, 181,014, 213,671 and 257,663. The process, now considered broadly conventional, typically involves the use of a catalyst formed from a Group VIII metal selected from palladium, cobalt or nickel, the anion of a non-hydrohalogenic acid having a pKa below about 6, preferably below 2, and a bidentate ligand of phosphorus, arsenic or antimony.

The resulting polyketone polymers are relatively high molecular weight materials having established utility as premium thermoplastics in the production of shaped articles by methods conventional for the processing of thermoplastics. Although the polymers are relatively stable, the linear alternating polymers do undergo some loss of desirable properties when exposed to heat for extended periods or when subjected to repeated cycles of melting and solidification.

Russell et al, U.S. Pat. No. 3,929,729 and U.S. Pat. No. 4,024,104, do teach the use of certain hindered phenolic benzophenones and benzotriazoles as thermal stabilizers of certain polymers of carbon monoxide and ethylene with the optional presence of third monomers. The scope of the disclosure of polymers by Russell et al is rather broad and includes linear alternating polymers, but the scope of materials tested by Russell et al is rather narrow and the teachings of Russell et al do not appear to be directed toward linear alternating polymers. Although a variety of phenolic materials has been conventionally employed to provide heat and melt stability to other classes of polymers, it would be of advantage to provide materials which provide improved thermal stability and improved melt stability to linear alternating polymers of carbon monoxide and at least one ethylenically unsaturated hydrocarbon.

SUMMARY OF THE INVENTION

This invention provides certain polymer compositions stabilized against the adverse effect of exposure to elevated temperature or to one or more cycles of melting and solidification. More particularly, the invention provides compositions comprising a linear alternating polymer of carbon monoxide and at least one ethylenically unsaturated hydrocarbon, which compositions demonstrate improved thermal stability and improved melt stability upon incorporation within the linear alternating polymer of certain phenolic compounds.

DESCRIPTION OF THE INVENTION

The compositions of the invention comprise linear alternating polymers of carbon monoxide and at least one ethylenically unsaturated hydrocarbon stabilized by the incorporation within the polymer of certain phenolic compounds. The ethylenically unsaturated hydrocarbons useful as precursors of the linear alternating polymers have up to 20 carbon atoms inclusive, preferably up to 10 carbon atoms inclusive, and are aliphatic such as ethylene and other α-olefins including propylene, butylene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. Preferred polyketone polymers for use in the compositions of the invention are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers of carbon monoxide, ethylene and a second hydrocarbon are employed in the compositions of the invention, there will be at least 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore represented by the repeating formula

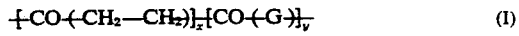 (I)

wherein G is the moiety of the second ethylenically unsaturated hydrocarbon of at least 3 carbon atoms polymerized through the ethylenic unsaturation and the ratio of y:x is no more than about 0.5. When the preferred copolymers of carbon monoxide and ethylene are employed, there will be no second hydrocarbon present and the polymers are represented by the above formula I wherein y is zero. When y is other than zero, i.e., terpolymers are employed, the —CO—CH$_2$CH$_2$— units and the —CO—G— units are found randomly throughout the polymer and the preferred ratio of y:x will be from about 0.01 to about 0.1. The end groups or "caps" of the polymer will depend upon what materials were present during the production of the polymer and whether or how the polymer was purified. The precise nature of the end groups does not appear to be of any considerable significance so far as the overall properties of the polymer are concerned so that the polymers are fairly represented by the polymer chain as depicted above.

Of particular importance are the polyketone polymers of number average molecular weight from about 1000 to about 200,000, particularly those polymers of number average molecular weight from about 20,000 to about 90,000, as determined by gel permeation chromatography (GPC). The physical properties of the polymers will depend in part on the molecular weight, whether the polymer is a copolymer or a terpolymer and, in the case of terpolymers, the nature of and the proportion of the second hydrocarbon present. Typical melting points for such polymers are from about 175° C. to about 300° C., more frequently from about 210° C. to about 275° C. The polymers will have a limiting viscosity number (LVN), expressed in dl/g when measured in m-cresol at 60° C. in a standard capillary viscosity measuring device, of from about 0.5 to about 10, preferably from about 0.8 to about 4.

The process for the production of the polyketone polymers is illustrated by the above published European Patent Applications and a process now becoming broadly conventional is to contact the carbon monoxide and ethylenically unsaturated hydrocarbon in the presence of a catalyst composition formed from a palladium compound, the anion of a non-hydrohalogenic acid having a pKa (measured in water at 18° C.) of below about 6, preferably below 2, and a bidentate ligand of phosphorus. The scope of the polymerization process is extensive but, without wishing to be limited, a preferred palladium salt is a palladium carboxylate, particularly palladium acetate, a preferred anion is the anion of trifluoroacetic acid or p-toluenesulfonic acid, and a preferred bidentate phosphorus ligand is 1,3-bis(diphenylphosphino)propane 1,3-bis[di(2-methoxyphenyl)phosphino]propane.

Polymerization is conducted in the liquid phase by contacting the carbon monoxide and hydrocarbon reactants under polymerization conditions in the presence of the catalyst composition and a reaction diluent. Suitable reaction diluents include the lower alkanols, especially methanol. Typical polymerization conditions include reaction temperatures from about 20° C. to about 150° C., preferably from about 50° C. to about 135° C. Useful reaction pressures are from about 1 bar to about 200 bar, but pressures from about 10 bar to about 100 bar are generally more satisfactory. Subsequent to reaction the polymerization is terminated as by cooling the reactor and contents and releasing the pressure. The polymer product is customarily obtained as a product substantially insoluble in the reaction diluent and is recovered by well known methods such as filtration or decantation. The polymer is used as recovered or is purified as by contact with a solvent or a complexing agent selective for catalyst residues.

The polyketone polymers are stabilized according to the invention by the incorporation of a phenolic compound of defined structure. In addition, the phenolic compound will have a second oxygen-containing functional group selected from hydroxy or alkoxy attached directly to an aromatic ring or indirectly through a benzyl substituent. One class of such compounds is represented by the formula

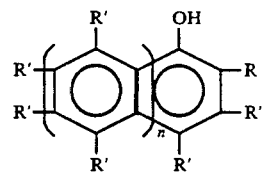

wherein R is hydrogen, alkyl of up to 18 carbon atoms, or alkoxybenzyl wherein the alkoxy is of up to 4 carbon atoms inclusive, R' independently is hydrogen, hydroxy, lower alkoxy, alkyl of up to 18 carbon atoms, phenyl, halophenyl or dialkylhydroxyphenyl and n is 0 or 1, with the proviso that at least one R' is hydroxy, alkoxy, or dialkylhydroxyphenyl, or R is 4-alkoxybenzyl. Such phenolic compounds include resorcinol, hydroquinone, 2-dodecylhydroquinone, 2,5-di-tert-butylhydroquinone, 1,4-dihydroxynaphthalene, 1,5-dihydroxynaphthalene, 2-phenylhydroquinone, 2-(2-chlorophenyl)hydroquinone, bis(3-methyl-6-t-butyl-4-hydroxyphenyl), 2-t-butyl-6-i-propylhydroquinone, 2,4-di-i-propyl-6-(4-ethoxybenzyl)phenol, 2,4-di-t-butyl-6-(4-methoxybenzyl)phenol and 2,6-di-t-amylhydroquinone. In general, compounds of the above formula II wherein n is 0 and R and/or one R' are linear or branched $C_3$-$C_{14}$ alkyl, phenyl, or 2-chlorophenyl are especially preferred, as are 2,6-di-t-butyl-4-methoxyphenol, 2,4-di-t-butyl-6-(4-methoxybenzyl)phenol and 2,5-di-t-butylhydroquinone, 2-phenylhydroquinone, 2-(2-chlorophenyl)hydroquinone, 2-dodecylhydroquinone, and bis(3-methyl-5-t-butyl-4-hydroxyphenyl).

The quantity of the phenolic compound to be employed in the compositions of the invention is not critical so long as a stabilizing quantity of the phenolic compound is employed. Typical stabilizing quantities of the phenolic compound are from about 0.005% by weight to about 5% by weight, based on total composition are satisfactory with quantities from about 0.01% by weight to about 1% by weight on the same basis being preferred. The phenolic compound is added to the polymer by conventional methods suitable for forming an intimate mixture of the polymer and the stabilizer components. Such methods include the dry blending of the polymer and stabilizer in finely divided form followed by hot pressing or by extrusion of the mixture. Alternatively, the stabilized composition is formed by blending the components in a mixing device operating at high shear. The stabilized compositions may include other components such as antioxidants, colorants, plasticizers, fibers and reinforcements and dyes which are added to the polymer together with or separately from the stabilizer.

The stabilized polyketone compositions are useful in the manufacture of fibers, sheets, films, laminates, container, wires and cables or other shaped articles of established utility which are produced by conventional methods such as melt-spinning, extrusion, injection molding and thermoforming. The compositions are particularly useful in applications such as containers for food and drink which are likely to encounter elevated temperature because of the heat stability imparted by the presence of the phenolic compound stabilizer. The melt stability also provided by the stabilizer is of particular importance when an article is produced by multiple melting and solidification cycles.

The invention is further illustrated by the following Illustrative Embodiments which should not be construed as limiting the invention.

ILLUSTRATIVE EMBODIMENT I

A linear alternating terpolymer of carbon monoxide, ethylene and propylene was produced in the presence of a catalyst composition formed from palladium acetate, trifluoroacetic acid and 1,3-bis[di(2-methoxyphenyl)phosphino]propane. The terpolymer had a melting point of 218° C. and a limiting viscosity number, measured in m-cresol at 60° C., of 1.84 dl/g.

ILLUSTRATIVE EMBODIMENT II

Sample plaques of the terpolymer of Illustrative Embodiment I were prepared. The polymer contained 0.5% of Irganox 1330, a commercial antioxidant, as background stabilizer. The terpolymer was cryoground and dry blended with 0.1% by weight and 0.5% by weight, each based on total composition, of various sterically hindered phenolic compounds. Each mixture was tumbled overnight and extruded on a 15 mm Baker-Perkins twin screw extruder operating at a temperature of 240° C. The extruded composition was used to make plaques of 0.03 in thickness by a compression molding process. A portion of the plaques were slow quenched and were used in the oven aging test of Illustrative Embodiment III and a portion of the plaques were rapid quenched and employed in the rheology testing of Illustrative Embodiment IV.

ILLUSTRATIVE EMBODIMENT III

A portion of the plaques produced in Illustrative Embodiment II were tested for long term heat stability by placing the plaques in a forced air circulation oven operating at 125° C. Periodically, samples were withdrawn and bent to a 180-degree angle. When the sample became sufficiently brittle to break under this test procedure it was considered to be in failure and the time to embrittlement was recorded. The results are shown in Table I.

TABLE I

| Stabilizer | Amount, % wt. | Hours to Failure |
| --- | --- | --- |
| None | — | 160 |
| 2,5-di-t-butylhydroquinone | 0.1 | 176 |
|  | 0.5 | 323 |
| 2,4-di-t-butyl-6-(4-methoxybenzyl)-phenol | 0.1 | 176 |
|  | 0.5 | 184 |
| 2,6-di-t-butyl-4-methoxyphenol | 0.1 | 160 |
|  | 0.5 | 176 |

ILLUSTRATIVE EMBODIMENT IV

Certain of the test plaques produced in Illustrative Embodiment II were subjected to rheological evaluation using a parallel plate Rheometrics apparatus operating at 275° C. and a frequency of 1 radian/sec and a strain rate of 25%.

In the rheology tests the viscosity of the sample was measured as a function of time and the slope of the increase in viscosity determined. The rate of viscosity increase (compared as the slope of the increase) is inversely related to the melt stability of the sample. The results of the evaluation are shown in Table II.

TABLE II

| Additive | Amount, % wt. | Slope |
| --- | --- | --- |
| None | — | 407 (average 8 runs) |
| 2,5-di-t-butylhydroquinone | 0.1 | 313 |
|  | 0.5 | 471 |
| 2,6-di-t-butyl-4-methoxyphenol | 0.1 | 388 |
|  | 0.5 | 274 |
| 2,4-di-t-butyl-6-(4-methoxybenzyl)-phenol | 0.1 | 320 |
|  | 0.5 | 301 |

ILLUSTRATIVE EMBODIMENT V

A second terpolymer of carbon monoxide, ethylene and propylene was produced by the general procedure of Illustrative Embodiment I. The second terpolymer had a melting point of 221° C. and a limiting viscosity number, measured in m-cresol at 60° C., of 1.86 dl/g.

ILLUSTRATIVE EMBODIMENT VI

Compositions containing the terpolymer of Illustrative Embodiment V and various phenolic compounds were produced according to a general procedure similar to that of Illustrative Embodiment II except that the background stabilizer was 0.23% by weight of Irganox 1330. Oven aging tests were performed at 120° C. by a procedure similar to that of Illustrative Embodiment III directly on strands extruded as the composition was produced rather than on plaques. The results are shown in Table III.

TABLE III

| Stabilizer | Amount, % wt. | Hours to Failure |
| --- | --- | --- |
| 2,5-di-t-butylhydroquinone | 0.2 | 890 |
|  | 0.8 | 890 |
| 2-phenylhydroquinone | 0.2 | 1030 |
|  | 0.8 | >1030 |
| 2-(2-chlorophenyl)hydroquinone | 0.2 | >1200 |
|  | 0.8 | 1040 |
| 2-dodecylhydroquinone | 0.2 | >1040 |
|  | 0.8 | 1200 |
| bis(3-methyl-5-t-butyl-4-hydroxyphenyl) | 0.2 | 1040 |
|  | 0.8 | 1040 |
| 1,4-dihydroxynaphthalene | 0.2 | 800 |
|  | 0.8 | 920 |
| 1,5-dihydroxynaphthalene | 0.2 | 890 |
|  | 0.8 | 710 |

ILLUSTRATIVE EMBODIMENT VII

A third terpolymer of carbon monoxide, ethylene, and propylene was produced by the general procedure of Illustrative Embodiment I. The third terpolymer had a melting point of 221° C. and a limiting viscosity number, measured in m-cresol at 60° C., of 1.86 dl/g.

ILLUSTRATIVE EMBODIMENT VIII

Sample plaques of the terpolymer of Illustrative Embodiment VII were prepared. The polymer contained 0.5% of Irganox 1330, a commercial antioxidant, as background stabilizer. The terpolymer was cryoground and dry blended with 0.1% by weight and 0.5% by weight, based on total composition, of 1,3,5-trihydroxybenzene. Each mixture was tumbled overnight and extruded on a 15 mm Baker-Perkins twin screw extruder operating at a temperature of 240° C. The extruded composition was used to make plaques of 0.03 in thickness by a compression molding process. A portion of the plaques were slow quenched and were used in the oven aging test of Illustrative Embodiment III.

The plaques were tested for long term heat stability by placing the plaques in a forced air circulation oven operating at 120° C. and at 125° C. Periodically, samples were withdrawn and bent to a 180-degree angle. When the sample became sufficiently brittle to break under this test procedure, it was considered to be in failure and the time to embrittlement was recorded. The results are shown in Table IV.

TABLE IV

| Stabilizer | Amount, wt % | Hours to Failure | |
| --- | --- | --- | --- |
| | | 125° C. | 100° C. |
| None | — | 240 | 1344 |
| 1,3,5-trihydroxybenzene | 0.1 | 288 | 1824 |
| | 0.5 | 312 | 2064 |

What is claimed is:

1. A stabilized composition comprising a linear alternating polymer of carbon monoxide and at least one ethylenically unsaturated hydrocarbon and incorporated therein a stabilizing quantity of a phenolic compound of the formula

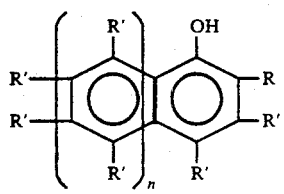

wherein R is hydrogen, alkyl of up to 18 carbon atoms or 4-alkoxybenzyl, R' independently is hydrogen, hydroxy, lower alkoxy, alkyl of up to 18 carbon atoms, phenyl, halophenyl or dialkylhydroxyphenyl and n is 0 or 1, with the proviso that at least one R' is hydroxy, alkoxy or dialkylhydroxyphenyl, or R is alkoxybenzyl.

2. The composition of claim 1 wherein the polymer is represented by the repeating formula

wherein G is a moiety of an ethylenically unsaturated hydrocarbon of at least 3 carbon atoms polymerized through the ethylenic unsaturation and the ratio of y:x is no more than about 0.5.

3. The composition of claim 2 wherein n is zero.

4. The composition of claim 3 wherein each alkyl is a linear or branched $C_3$-$C_{14}$ alkyl and each alkoxy is methoxy.

5. The composition of claim 3 wherein the stabilizing quantity is from about 0.005% by weight to about 5% by weight based on total composition.

6. The composition of claim 5 wherein y is zero.

7. The composition of claim 6 wherein the phenolic compound is 2,6-di-t-butyl-4-methoxyphenol, 2,4-di-t-butyl-6-(4-methoxybenzyl)phenol or 2,5-di-t-butylhydroquinone.

8. The composition of claim 5 wherein the ratio of y:x is from about 0.01 to about 0.1.

9. The composition of claim 8 wherein G is a moiety of propylene.

10. The composition of claim 9 wherein the phenolic compound is 2,6-di-t-butyl-4-methoxyphenol, 2,4-di-t-butyl-6-(4-methoxybenzyl)phenol or 2,5-di-t-butylhydroquinone.

11. The composition of claim 10 wherein the phenolic compound is 2,6-di-t-butyl-4-methoxyphenol.

12. The composition of claim 10 wherein the phenolic compound is 2,4-di-t-butyl-6-(4-methoxybenzyl)phenol.

13. The composition of claim 10 wherein the phenolic compound is 2,5-di-t-butylhydroquinone.

14. The composition of claim 9 wherein the phenolic compound is 2-phenylhydroquinone.

15. The composition of claim 9 wherein the phenolic compound is 2-dodecylhydroquinone.

16. The composition of claim 9 wherein the phenolic compound is 2-(2-chlorophenyl)hydroquinone.

17. The composition of claim 9 wherein the phenolic compound is bis(3-methyl-5-t-butyl-4-hydroxyphenyl.

18. A process of stabilizing a linear alternating polymer of carbon monoxide and at least one ethylenically unsaturated hydrocarbon by incorporating therein a stabilizing quantity of a phenolic compound of the formula

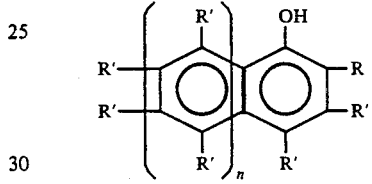

wherein R is hydrogen, alkyl of up to 18 carbon atoms or 4-alkoxybenzyl, R' independently is hydrogen, hydroxy, lower alkoxy, alkyl of up to 18 carbon atoms, phenyl, halophenyl or dialkylhydroxyphenyl and n is 0 or 1, with the proviso that at least one R' is hydroxy, alkoxy, or dialkylhydroxyphenyl, or R is alkoxybenzyl.

19. The process of claim 18 wherein the polymer is represented by the repeating formula

wherein G is a moiety of an ethylenically unsaturated hydrocarbon of at least 3 carbon atoms polymerized through the ethylenic unsaturation and the ratio of y:x is no more than about 0.5.

20. The process of claim 19 wherein n is zero.

21. The process of claim 20 wherein the stabilizing quantity is from about 0.005% by weight to about 5% by weight based on total composition.

22. The process of claim 21 wherein y is zero.

23. The process of claim 22 wherein the phenolic compound is 3,5-di-t-butyl-4-methoxyphenol, 2,4-di-t-butyl-6-(4-methoxybenzyl)phenol or 2,5-di-t-butylhydroquinone.

24. The process of claim 21 wherein the ratio of y:x is from about 0.01 to about 0.1.

25. The process of claim 24 wherein G is a moiety of propylene.

26. The process of claim 25 wherein the phenolic compound is 2,6-di-t-butyl-4-methoxyphenol, 2,4-di-t-butyl-6-(4-methoxybenzyl)phenol or 2,5-di-t-butylhydroquinone.

27. The process of claim 26 wherein the phenolic compound is 2,6-di-t-butyl-4-methoxyphenol.

28. The process of claim 26 wherein the phenolic compound is 2,4-di-t-butyl-6-(4-methoxybenzyl)phenol.

29. The process of claim 26 wherein the phenolic compound is 2,5-di-t-butylhydroquinone.

30. The process of claim 23 wherein the phenolic compound is 2-phenylhydroquinone.

31. The process of claim 23 wherein the phenolic compound is 2-dodecylhydroquinone.

32. The process of claim 23 wherein the phenolic compound is bis(3-methyl-5-t-butyl-4-hydroxyphenyl).

33. The process of claim 23 wherein the phenolic compound is 2-(2-chlorophenyl)hydroquinone.

* * * * *